US011716656B2

(12) United States Patent
Sridhar et al.

(10) Patent No.: US 11,716,656 B2
(45) Date of Patent: Aug. 1, 2023

(54) SYSTEM AND METHOD FOR HANDOVER MANAGEMENT IN MOBILE NETWORKS

(71) Applicant: Sandvine Corporation, Waterloo (CA)

(72) Inventors: Kamakshi Sridhar, Plano, TX (US); Lars Anton Gunnarsson, Bangkok (TH); Alexander Havang, Malmo (SE)

( * ) Notice: Subject to any disclaimer, the term of this patent is extended or adjusted under 35 U.S.C. 154(b) by 0 days.

(21) Appl. No.: 16/940,616

(22) Filed: Jul. 28, 2020

(65) Prior Publication Data

US 2021/0195480 A1  Jun. 24, 2021

Related U.S. Application Data

(60) Provisional application No. 62/950,165, filed on Dec. 19, 2019.

(51) Int. Cl.
  *H04W 36/00* (2009.01)
  *H04W 24/08* (2009.01)
  *H04W 36/32* (2009.01)

(52) U.S. Cl.
  CPC ....... *H04W 36/0079* (2018.08); *H04W 24/08* (2013.01); *H04W 36/00835* (2018.08); *H04W 36/00837* (2018.08); *H04W 36/32* (2013.01)

(58) Field of Classification Search
  None
  See application file for complete search history.

(56) References Cited

U.S. PATENT DOCUMENTS

| 9,253,704 | B1 * | 2/2016 | Sarkar | H04W 36/305 |
| 2010/0173633 | A1 * | 7/2010 | Catovic | H04W 24/02 |
| | | | | 455/436 |
| 2011/0086634 | A1 | 4/2011 | Rahman | |
| 2015/0045028 | A1 * | 2/2015 | Singh | H04W 36/00837 |
| | | | | 455/436 |
| 2015/0195762 | A1 | 7/2015 | Watanabe et al. | |
| 2016/0014650 | A1 * | 1/2016 | Laganier | H04W 36/00837 |
| | | | | 370/331 |
| 2017/0026861 | A1 * | 1/2017 | Tseng | H04W 24/08 |
| 2019/0387439 | A1 * | 12/2019 | Huang | H04W 24/02 |

FOREIGN PATENT DOCUMENTS

EP    2139277 A1    12/2009

* cited by examiner

*Primary Examiner* — Suhail Khan
(74) *Attorney, Agent, or Firm* — Amarok IP Inc.; Neil W. Henderson

(57) ABSTRACT

A method for managing handovers on a network including: determining neighboring cells within the network; mapping the neighboring cells; analyzing handover data between the mapped cells, wherein the handover data may be retrieved from network messaging; determining for each handover whether the handover is successful or unsuccessful based on the handover data; and reporting unsuccessful handovers to an operator for the network. a system for managing handovers on a network, the system including: a relation module configured to determine neighboring cells within the network and map the neighboring cells; an analysis module configured to analyzing handover data between the mapped cells, wherein the handover data may be retrieved from network messaging and determine for each handover whether the handover is successful or unsuccessful based on the handover data; and a reporting module configured to report unsuccessful handovers to an operator for the network.

20 Claims, 9 Drawing Sheets

| FROM CELL | TO CELL | Time duration for monitoring the number of handovers | | | | | | Conclusions: HO failures, Highly loaded cells | Severity Levels (H,M,L) |
|---|---|---|---|---|---|---|---|---|---|
| | | 1 hour | 12 hours | 24 hours | 3 days | 1 week | 1 month | | |
| 1 | 3 | 2 times | 8 times | 14 times | 26 times | 42 times | 153 times | All is well | Not Applicable |
| 3 | 1 | 0 times | 0 times | 2 times | 3 times | 4 times | 6 times | Possible HO failure | Low |
| 5 | 3 | 0 times | 0 times | 0 times | 0 times | 4 times | 32 times | HO failure | High |
| 3 | 5 | 0 times | 1 times | 2 times | 2 times | 3 times | 4 times | Very little traffic into cell 5. Possible HO failure | Medium |
| 4 | 5 | 1 times | 2 times | 3 times | 4 times | 4 times | 5 times | | |
| 5 | 4 | 24 times | 156 times | 245 times | 329 times | 645 times | 1247 times | Cell 4 is highly loaded | Highly loaded |

| Source Cell | Neighbors | | | | |
|---|---|---|---|---|---|
| 1 | 3 | 8 | 9 | | |
| 3 | 1 | 8 | 9 | 4 | 5 |
| 5 | 3 | 4 | 6 | 7 | 9 |
| 8 | 1 | 3 | 4 | | |
| 4 | 5 | 3 | 6 | | |
| ⋮ | | | | | |
| ⋮ | | | | | |

| FROM CELL | TO CELL | Time duration for monitoring the number of handovers | | | | | | Conclusions: HO failures, Highly loaded cells | Severity Levels (H,M,L) |
|---|---|---|---|---|---|---|---|---|---|
| | | 1 hour | 12 hours | 24 hours | 3 days | 1 week | 1 month | | |
| 1 | 3 | 2 times | 8 times | 14 times | 26 times | 42 times | 153 times | All is well | Not Applicable |
| 3 | 1 | 0 times | 0 times | 2 times | 3 times | 4 times | 6 times | Possible HO failure | Low |
| 5 | 3 | 0 times | 0 times | 0 times | 0 times | 4 times | 32 times | HO failure | High |
| 3 | 5 | 0 times | 1 times | 2 times | 2 times | 3 times | 4 times | Very little traffic into cell 5. Possible HO failure | Medium |
| 4 | 5 | 1 times | 2 times | 3 times | 4 times | 4 times | 5 times | Possible HO failure | |
| 5 | 4 | 24 times | 156 times | 245 times | 329 times | 645 times | 1247 times | Cell 4 is highly loaded | Highly loaded |

FIG. 9

| From Cell_i | From Cell_j | Highest values of the HO duration between Cell_i and Cell_j based on prior history of movement between Cell_i and Cell_j |
|---|---|---|
| Cell 3 | Cell 4 | H34 eg 34 seconds |
| Cell 4 | Cell 7 | H47 eg 28 seconds |
| Cell 4 | Cell 6 | H64 eg 19 seconds |
| Cell 6 | Cell 5 | H56 eg 42 seconds |
| Cell 5 | Cell 4 | H45 eg 51 seconds |
| Cell 4 | Cell 8 | H84 eg 26 seconds |

FIG. 10

| From Cell_i | To Cell_j | Highest values of HO times | How often do the actual HO time exceed the 'Highest Value'? | Type of HO failure | | |
|---|---|---|---|---|---|---|
| | | | | Too Early | Too Late | Ping Pong |
| Cell 3 | Cell 4 | 34 seconds | 3 | 1 | 2 | 0 |
| Cell 4 | Cell 7 | 28 seconds | 0 | | | |
| Cell 4 | Cell 6 | 19 seconds | 5 | 2 | 1 | 2 |
| Cell 6 | Cell 5 | 42 seconds | 2 | 2 | 0 | 0 |
| Cell 5 | Cell 4 | 51 seconds | 0 | | | |
| Cell 4 | Cell 8 | 26 seconds | 1 | 0 | 1 | 0 |

| UE | FROM | | To | |
|---|---|---|---|---|
| A | t11 | Cell 3 | t12 | Cell 4 |
| A | t21 | Cell 4 | t22 | Cell 7 |
| A | t31 | Cell 34 | t32 | Cell 6 |
| B | t41 | Cell 6 | t42 | Cell 5 |
| B | t51 | Cell 5 | t52 | Cell 4 |
| B | t61 | Cell 4 | t62 | Cell 8 |

FIG. 13

| UE | From Cell_i | To Cell_j | Duration of HO | Highest values of the HO duration between Cell_i and Cell_j based on prior history of movement between Cell_i and Cell_j |
|---|---|---|---|---|
| A | t11 Cell 3 | t12 Cell 4 | t12-t11 | H34 eg 34 seconds |
| A | t21 Cell 4 | t23 Cell 7 | t23-t21 | H47 eg 28 seconds |
| A | t31 Cell 4 | t32 Cell 6 | t32-t31 | H64 eg 19 seconds |
| B | t41 Cell 6 | t42 Cell 5 | t42-t41 | H56 eg 42 seconds |
| B | t51 Cell 5 | t52 Cell 4 | t52-t51 | H45 eg 51 seconds |
| B | t61 Cell 4 | t62 Cell 8 | t62-t61 | H84 eg 26 seconds |

| From Cell_i | To Cell_j | Highest values of HO times | How often do the actual HO time exceed the 'Highest Value'? | Type of HO failure | | |
|---|---|---|---|---|---|---|
| | | | | Too Early | Too Late | Ping Pong |
| Cell 3 | Cell 4 | 34 seconds | 3 | 1 | 2 | 0 |
| Cell 4 | Cell 7 | 28 seconds | 0 | | | |
| Cell 4 | Cell 6 | 19 seconds | 5 | 2 | 1 | 2 |
| Cell 6 | Cell 5 | 42 seconds | 2 | 2 | 0 | 0 |
| Cell 5 | Cell 4 | 51 seconds | 0 | | | |
| Cell 4 | Cell 8 | 26 seconds | 1 | 0 | 1 | 0 |

FIG. 16

SYSTEM AND METHOD FOR HANDOVER MANAGEMENT IN MOBILE NETWORKS

RELATED APPLICATIONS

This application claims priority on U.S. Patent Application No. 62/950,165 filed Dec. 19, 2019, which is hereby incorporated by reference.

FIELD

The present disclosure relates generally to computer network traffic. More particularly, the present disclosure relates to a system and method for handover detection and failure management in computer networks.

BACKGROUND

Network traffic continues to increase all over the world. As network traffic increases, service providers continue to upgrade their network equipment to better serve their subscribers. Once such network upgrade has been to begin implementing fifth generation (5G) networks within an area served by the service provider.

5G networks are configured to greatly increase the speed and efficiency of wireless networks. 5G networks are intended to include a large number of small cell stations as compared to 4G networks, which are served by high power cell towers that radiate over long distances. As a user moves from one cell to another, a Handover occurs from a source cell to a neighboring cell. With the increase of 5G networks, and with the intermixing of 5G and 4G networks in the future, a greater number of handovers are expected for users of these networks.

It is, therefore, desirable to provide an improved method and system for handover management and, in particular, for handover detection and failure management.

The above information is presented as background information only to assist with an understanding of the present disclosure. No determination has been made, and no assertion is made, as to whether any of the above might be applicable as prior art with regard to the present disclosure.

SUMMARY

In a first aspect, there is provided a method for managing handovers on a network, the method including: determining neighboring cells within the network; mapping the neighboring cells; analyzing handover data between the mapped cells, wherein the handover data may be retrieved from network messaging; determining for each handover whether the handover is successful or unsuccessful based on the handover data; and reporting unsuccessful handovers to an operator for the network.

In some cases, the method may further include, determining the type of handover failure for the unsuccessful handovers.

In some cases, the method may further include, providing for corrective action for the unsuccessful handovers.

In some cases, the network messaging may include S11 or S1-MME (S1-CP) messages.

In some cases, determining neighboring cells may include: monitoring user equipment as the user equipment travels; recording a source cell and a target cell for each cell handover; and determining which cells are connected based on the recorded source and target cells.

In some cases, a handover may be determined as unsuccessful based on a lack of network messaging.

In some cases, the lack of network messaging may include: an S11 event message with a source cell and no subsequent S11 event message from a target cell.

In some cases, determining the type of handover failure may include: determining signaling patterns from the network messaging; and correlating the signaling patterns with data plane traffic patterns.

In some cases, the data plan traffic patterns may be upstream traffic patterns.

In some case, the method may further include: aggregating results of the successful and unsuccessful handovers; determining if there is an number of handovers between a pair of network cells over a predetermined threshold; if there is over the predetermined threshold, triggering a load balancing between for the pair of network cells.

In another aspect, there is provided a system for managing handovers on a network, the system including: a relation module configured to determine neighboring cells within the network and map the neighboring cells; an analysis module configured to analyzing handover data between the mapped cells, wherein the handover data may be retrieved from network messaging and determine for each handover whether the handover is successful or unsuccessful based on the handover data; and a reporting module configured to report unsuccessful handovers to an operator for the network.

In some cases, the system may further include: a correlation module configured to determine the type of handover failure for the unsuccessful handovers.

In some cases, the reporting module may further be configured to provide for corrective action for the unsuccessful handovers.

In some cases, the network messaging comprises S11 or S1-MME (S1-CP) messages.

In some cases, the relation module may be configured to determine neighboring cells by: monitoring user equipment as the user equipment travels; recording a source cell and a target cell for each cell handover; and determining which cells are connected based on the recorded source and target cells.

In some cases, the analysis module determines a handover is determined as unsuccessful based on a lack of network messaging.

In some cases, the lack of network messaging may include: an S11 event message with a source cell and no subsequent S11 event message from a target cell.

In some cases, the correlation module may determine the type of handover failure by: determining signaling patterns from the network messaging; and correlating the signaling patterns with data plane traffic patterns.

In some cases, the data plan traffic patterns may be upstream traffic patterns.

In some cases, the analysis module may be further configured to aggregate results of the successful and unsuccessful handovers and determine if there is an number of handovers between a pair of network cells over a predetermined threshold; and the reporting module may be further configured to trigger a load balancing between for the pair of network cells to if the number of handovers is over the predetermined threshold.

Other aspects and features of the present disclosure will become apparent to those ordinarily skilled in the art upon review of the following description of specific embodiments in conjunction with the accompanying figures.

BRIEF DESCRIPTION OF FIGURES

Embodiments of the present disclosure will now be described, by way of example only, with reference to the attached Figures.

FIG. 9 is a table showing handover failure and severity levels;
FIG. 10 is a table showing neighbor relations;
FIG. 13 is a table showing User Equipment movement across cells;
FIG. 16 is a table showing the detection of handover failures of various types.

DETAILED DESCRIPTION

Generally, the present disclosure provides a method and system for handover management. Embodiments of the system and method detailed herein are intended to determine when a handover has taken place, the cells involved in the handover, whether the handover has been successful and failure management. In some cases, the system may determine trends with respect to handover failures and may be able to provide data or corrective action with respect to the handovers.

Conventional LTE Mobile networks deliver traffic to the end user over a Radio Access Network that generally includes a plurality of base stations or evolved Node Bs (eNBs). These eNBs may serve their users on spectrum bands either in the same carrier, or dedicated carriers. User equipment (UEs) within an eNB or moving across eNBs get served by the spectral resources of that eNB and can send and receive data over the LTE network.

Figure 1:
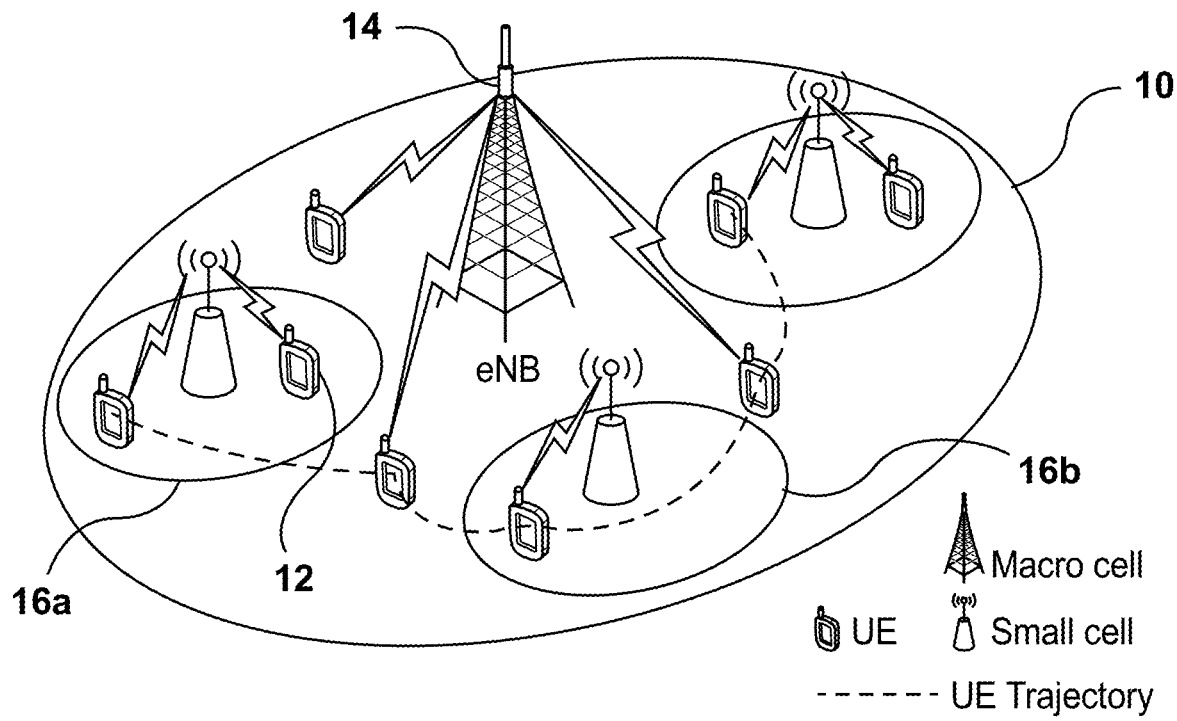
FIG. 1 illustrates a computer network.

FIG. 1 illustrates an LTE network 10 with a user equipment 12 moving through a plurality of handovers. A handover (HO) is a transfer of an ongoing call or data session from one eNB to another eNB. As a UE moves between cells, an associated eNB 14 is configured to 'Handover' the UE 12 from a source cell 16a to a target neighboring cell 16b in a timely manner. Once the UE 12 is in the target cell 16b, it is served by the radio resources in that target cell 16b. Ideally, all Handovers are intended to be successful. In reality, as UE 12 speed increases and/or as the cell coverage becomes smaller and smaller, the probability of Handover Failures becomes higher. The radio bearer session may get dropped, called Radio Link Failure, resulting in possible Quality of Service/application, Quality of Experience or the like degradation.

There are several network scenarios which may occur. In some cases, the network may include LTE Macro only or LTE Macro cells with small cells (as shown in FIG. 1). As LTE networks get more congested, operators are beginning to deploy 5G that will operate in high frequency bands. HO failures are more likely with 5G small cells because there are many more cells with 5G (dedicated carriers). As noted from FIG. 1, with the additions of 5G cells, a user may experience a plurality of handovers when previously the user may have been served by a single 4G cell tower.

As such, there may be significantly more HOs between 5G cells and 5G to and from 4G cells, than there have been with just 4G cells previously. With more HOs occurring, this leads to the potential for more HO failures than has previously been expected. In a successful handover process, the session call is continued, and from a user perspective, the flow is transferred from one cell to another without the need for a new connection establishment by the user. During a handover failure, the user may experience degradation in the service, or may require to reconnect to continue the session. It will be understood that embodiments of the system and method detailed herein are configured to apply to various 5G networks, including 5G radio (New Radio (NR)) and 5G core (Standalone (SA)) networks.

Conventionally, Handover failures have been tricky to diagnose particularly in multi-technology, multi-vendor environments. Further, HO failures may be hard to detect due to the distributed nature of eNBs.

Embodiments of the system and method disclosed herein are intended to use data plane and control plane measurements that can allow Service Providers or Network Operators to detect HO failures in what is intended to be a vendor agnostic, scalable way. Once detected and alerted, Operators may be able to fine-tune Handover parameters, which is intended to reduce the number of Handover failures experienced by the network. When handover failures occur, there are thresholds that may be modified at the source or originating cell to attempt to correct the issue, for example time to trigger, handover margin, hysteresis thresholds or the like.

Figure 2:
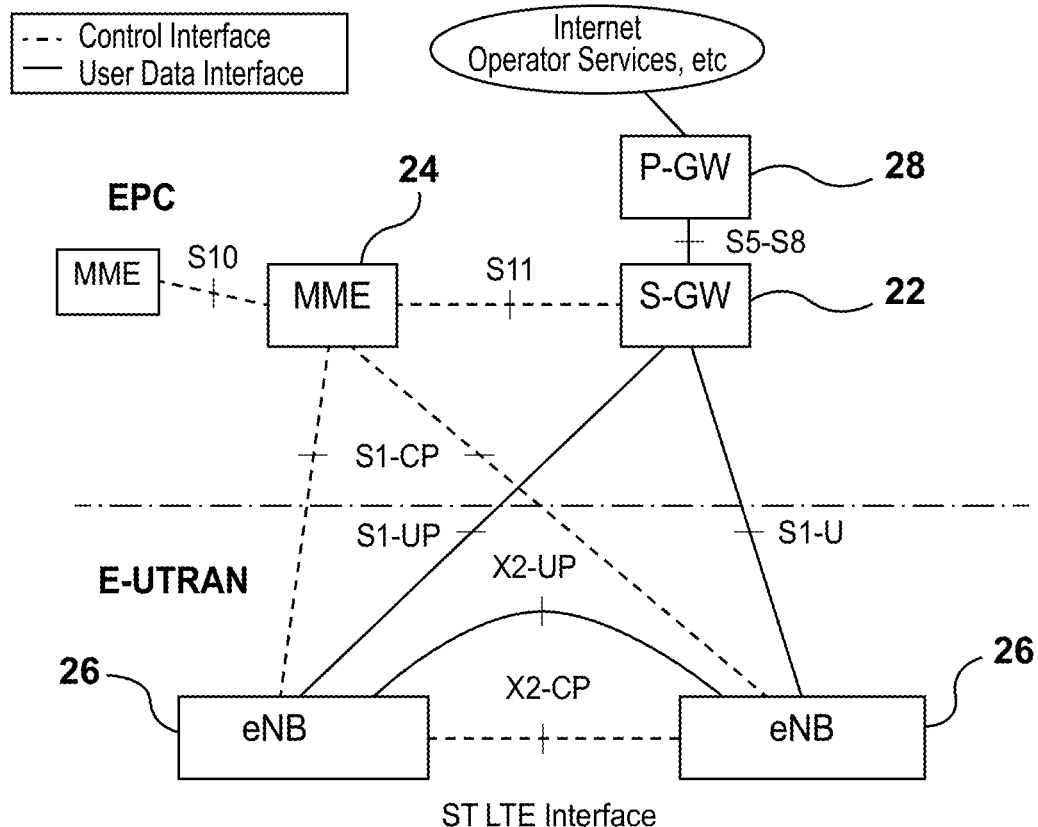
FIG. 2 illustrates a diagram of an LTE network.

FIG. 2 illustrates an LTE network 20 with various interfaces. Embodiments of the method and system disclosed herein are intended to review and retrieve data from a control interface, for example, the S11 (between a Serving Gateway (SGW) 22 and Mobility Management Entity (MME) 24). In some cases, the retrieved data may be obtained by S1-CP (between eNB 26 and SGW). The S1-CP may also be referred to as the S1-MME.

For the examples given below, the system and method refer to data obtained from S11 to provide control plane information. It will be understood that it is possible to equivalently use the S1-MME (also called S1-CP) or other similar measurements if available. In addition, for some embodiments of the system and method disclosed herein, a data plane interface that will enable data plane visibility is the SGi interface north of the Packet Data Network Gateway (PGW) 28. An alternative would be the S5/S8 interface between the SGW and the PGW. Other methods may be or become available and may also be used to gather relevant data.

Referring back to FIG. 1, the network shows a RAN having one eNB macro cell and multiple small cells. The reach of a cell, which refers to the coverage of a cell, depends on the spectrum band on which the radio is operating. Lower frequency bands typically have higher coverage compared to higher frequency bands.

UEs move from cell to cell through a mechanism referred to as a Handover (HO). The Handover mechanism transfers an ongoing call or data session from one base station to another base station or one sector to another sector within same base station. Handovers are typically exercised when the UE detects a cell with a strong incoming radio signal. The handover performance is important, especially for real-time service, since the handover failure rate tends to increase with a higher moving velocity. Furthermore, a failure in HO will interrupt the delivery of high data rates, likely resulting in lower Quality of Service and Quality of Experience for the user.

Typically, the handover process within an LTE system includes measurement, judgment and execution. In a specific example, a UE measures the downlink signal (Reference Signal Receive Power (RSRP)) between the serving cell and itself, and the neighboring cell and itself. A measurement report is done in order to make a reselection or handover decision. Then, through a radio resource control (RRC) signaling in the uplink, the report on the estimates signal strength is delivered to the serving cell. If predetermined decision handover criterion is met, the serving cell will handover the UE to the neighboring cell or the target cell. In a specific example, an LTE Event A3 is triggered when a neighboring cell becomes better than the serving cell by an offset. The offset can be either positive or negative. An LTE Event A5 is triggered when the serving cell becomes worse than threshold-1 while a neighboring cell becomes better than threshold-2.

Typically, if a Handover fails, then the Radio bearer breaks down, packets get buffered up, which can potentially cause network congestion, throughput goes down, real-time applications are delayed and/or VoLTE calls drop. In some cases, calls may be reestablish but the UE performance will likely have been degraded.

Embodiments of the system and method disclosed herein are intended to provide a non-invasive and scalable solution to detect the occurrence of handover failures between, for example, 4G cells, 4G and 5G cells and between 5G cells. Further, embodiments of the system and method are intended to determining the type of handover failures (for example, too early handover, too late handover, ping-pong, and/or other causes) between 4G cells, 4G and 5G cells and between 5G cells.

Detection of Handover Failures in a timely manner is considered challenging because the cells may be, for example, of different types and geographical reach, different technologies, from multiple vendors and the like. Detecting the failure and the type of failure has conventionally been difficult or impossible.

Operators are currently investing in 5G to address the capacity crunch in mobile networks. The issue of Handover detection may be considered even more critical as 5G is deployed because 5G operates at higher frequency bands that have smaller coverage. Many more small cells (4G or 5G) will result in many more handovers between cells resulting in higher probability of handover failures. Although, small cell deployments at high bands may partially address the capacity crunch, it requires a lot of careful network fine-tuning to prevent handover failures.

Embodiments of the method and system detailed herein are intended to operate with Self-Organizing Networks (SON) Handover optimization or Mobility Robustness optimization (MRO). In particular, MRO is a solution for automatic detection and correction of errors in the mobility configuration. Further, the errors causing Radio link failure (RLF) due to too late or early handover, or handover to an incorrect cell may be understood. Although the typical errors causing handover failures may be known, the detection of these errors remains challenging because the entity flagging these errors needs to aggregate data from multiple eNBs (some of which may be from multiple vendors) continuously and process them before positively identifying the errors. It will be understood that messaging for 5G networks may further include data from gNodeB's. Moreover, the detection of errors may include corroborating certain events which may otherwise have not been perceived or understood.

Figure 3:
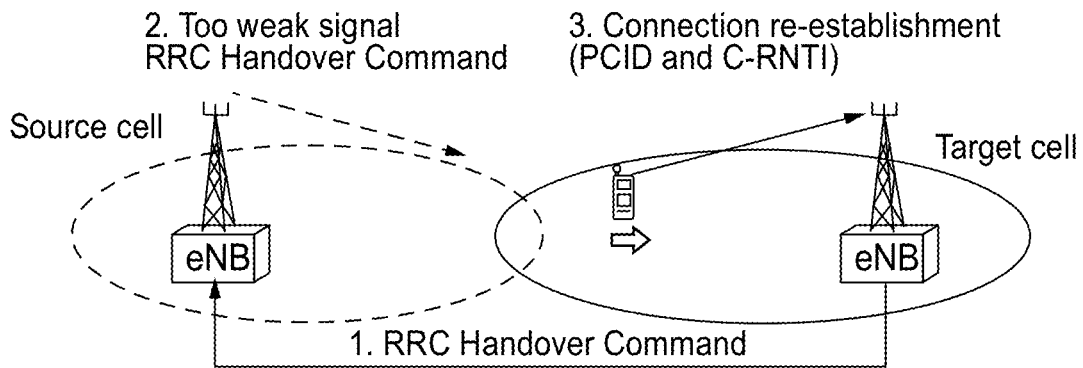
FIG. 3 illustrates a late handover.

FIG. 3 illustrates an example of a late handover. In a late handover, the handover procedure in the source cell is initialized too late, and the UE is moving faster than the Handover (HO) parameter settings allow. Hence, when the RRC HO command from the serving cell is transmitted, the signal strength is too weak to reach the UE, now located in the target cell, and the connection is lost. The UE may attempt a connection re-establishment, containing PCID and C-RNTI belonging to the source cell, but received by the target cell, which therefore may not be successful. The target eNB may then inform the source cell about the Radio Link Failure (RLF) to adjust Handover parameters.

Figure 4:
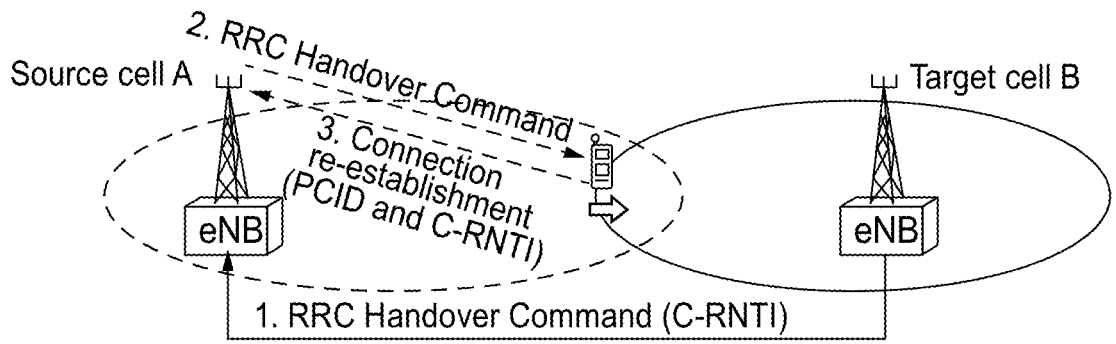
FIG. 4 illustrates an early handover.

FIG. 4 illustrates an example of a too early handover. The UE may have been successfully handed over from source cell A to target cell B, but since the handover was triggered too early the connection may drop almost immediately due to poor radio conditions in the target cell B. The UE may then try to re-establish the connection, which may now take place in the original source cell, cell A, as this cell may be considered the stronger cell by the UE. The UE will use the PCID and RNTI (Radio Network Temporary Identifier) from the target cell B and the source cell A may consider this as a Radio Link Failure due to too late handover and send an indication to the target cell B. As the target cell B may now recognize the parameters in the indication, as given to a mobile that had just completed a handover to cell B from cell A, which indicates a failure. The target cell B may send back a report about too early Handover to adjust Handover parameters, to the source cell A.

It has been determined that there may be some drawbacks with the Distributed SON approach to address Handover Failures. In particular, in a Distributed SON approach, the information about the Handover Failures is contained within the cell. As the number of cells increase, and as the cells are installed from multiple vendors, this information is scattered across many cells making it difficult to turn the information into actions to help improve Handover performance. Moreover, a given eNB may not be fully informed of the handover failures occurring at the other eNBs. As a result, the HO failure outcome decisions made by a single eNB may not be accurate due to incomplete information.

It has also been determined that there may be drawbacks of the Centralized SON approach to address Handover Failures. In a Centralized SON approach, the eNB sends handover statistics to a dedicated centralized SON server that is intended to collect eNB handover statistics to make inferences on whether there is a handover failure, and if so—the type of handover failure. For centralized SON mechanisms to work, these mechanisms require an offline centralized SON server that requires inputs through a northbound SON interface. These northbound interfaces are not standardized. In practice, operation in multivendor network can often result in inaccurate handover failure detection because of the lack of standards for this type of information.

Figure 5:
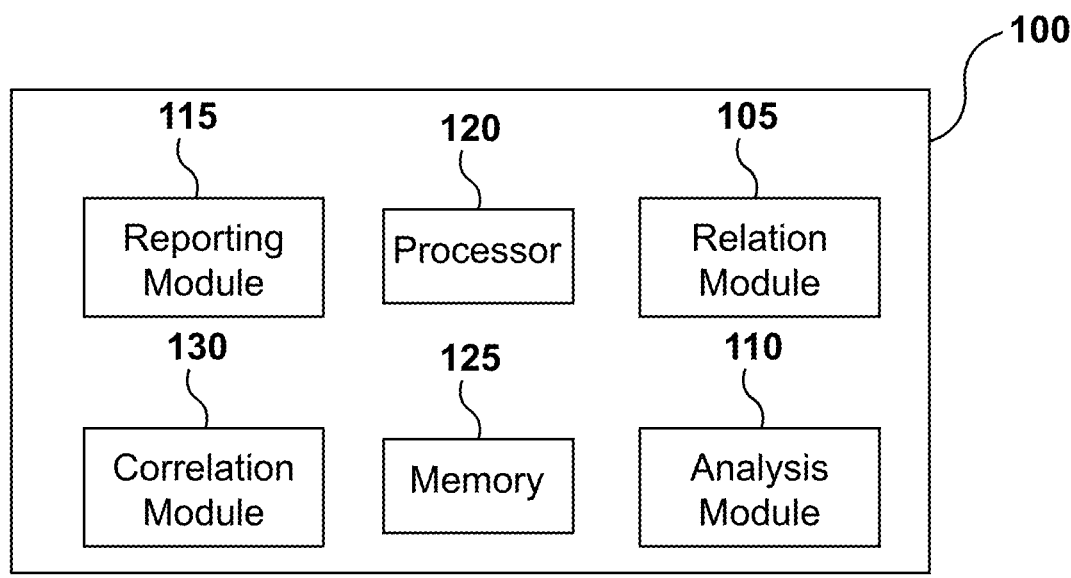
FIG. 5 illustrates a system for handover management according to an embodiment.

FIG. 5 illustrates an embodiment of a system 100 for handover management. The system includes a relation module 105, an analysis module 110, a reporting module 115, at least one processor 120 and at least one memory component 125. In some cases, the system may further include a correlation module 130. The system is generally intended to reside on the core network but may be distributed. The modules, including the processor 120 and memory 125, are in communication with each other but may be distributed over various network devices or may be housed within a single network device. The system 100 is intended to receive information from the computer network equipment that allows the system to determine traffic flow information, including application type.

The relation module 105 is configured to learn/determine a network configuration and learn/determine neighboring cells to create a network cell map as detailed herein.

The analysis module 110 is configured to analyze the handover data to determine successful handovers and unsuccessful handovers. The analysis module 110 is configured to determine which cells are possibly experiencing a handover failure, as well as which cells may be overloaded. The analysis module 110 may be configured to aggregate handover data over a period of time as well as over various handover cell pairs or the like to determine handover trends.

The reporting module 115 is configured to report any determined handover failure to a service provider for the network. The reporting module 115 may further provide for network action which is intended to reduce the number of handover failures, for example, the reporting module 115 may be configured to provide for handover setting changes or trigger different change times for the handover settings. In other cases, the reporting module 115 may provide instructions to a different network device to update the handover settings and configuration. The reporting module 115 may also, of course, report various results to network operators or controllers for network management purposes.

In some cases, the system 100 may further include a correlation module 130. The correlation module 130 can be configured to review the data retrieved from the analysis module 110 as well as further messaging data to determine the type of HO failure that may have occurred. Knowing what type of HO is occurring between cells is intended to provide for more accurate remedies or network actions to address the situation.

Figure 6:
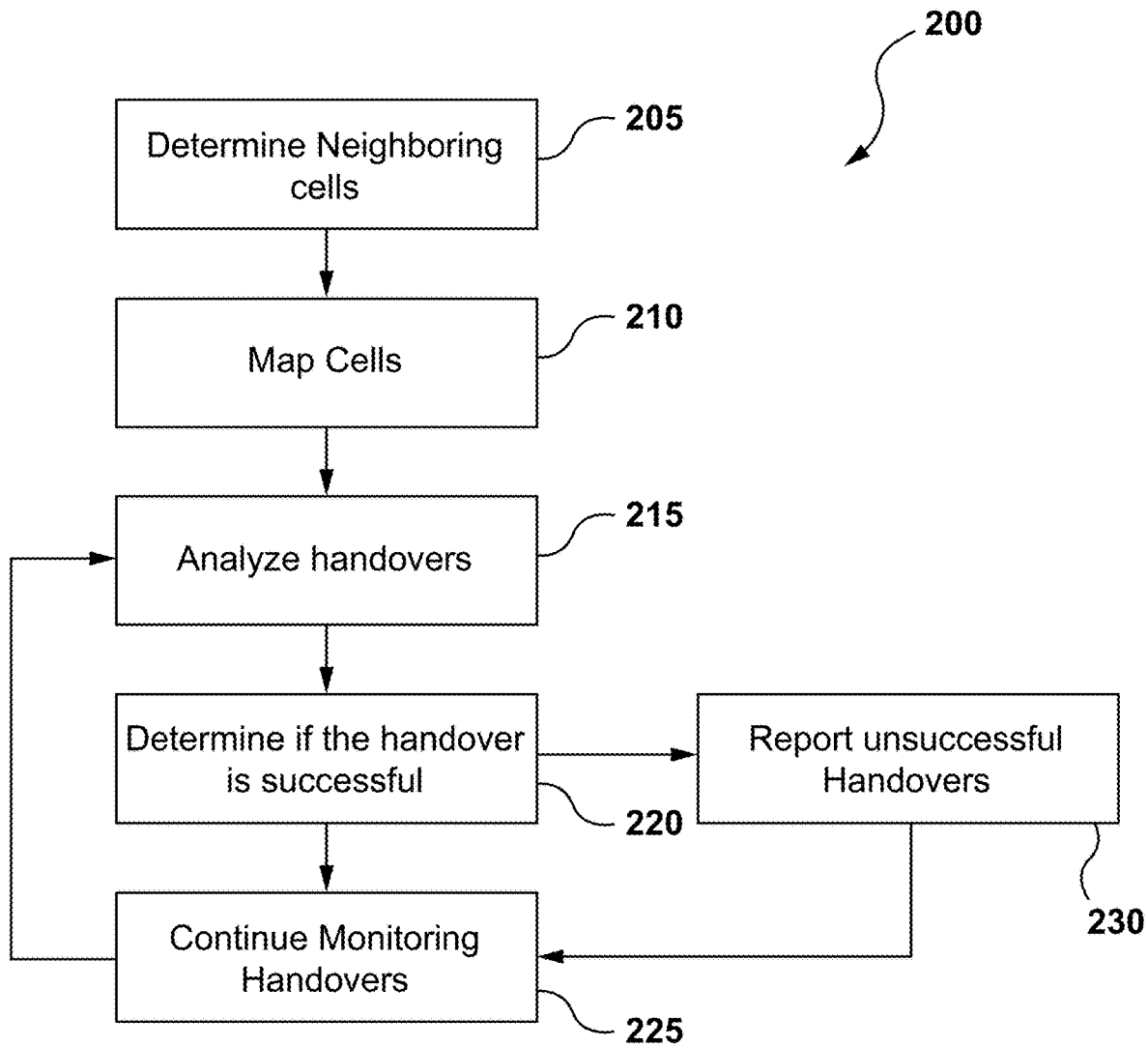
FIG. 6 illustrate a method for handover management according to an embodiment.

FIG. 6 is a flow chart illustrating a method 200 for handover management on a network. At 205, the relation module 105 determines the neighboring cells in the network. At 210, the relation module 205 is configured to map the cells and create a network cell map. At 215, the analysis module 110 is configured to analyze handover data to determine the handovers between the cells. At 220, the analysis module 110 may then determine whether the handover was successful. If the handover was successful, the system may continue to monitor and analyze handovers, at 225. If the handover was not successful, the reporting module 115 may be configured to report the failure and may further be configured to take corrective actions if appropriate.

Figures 7, 8:
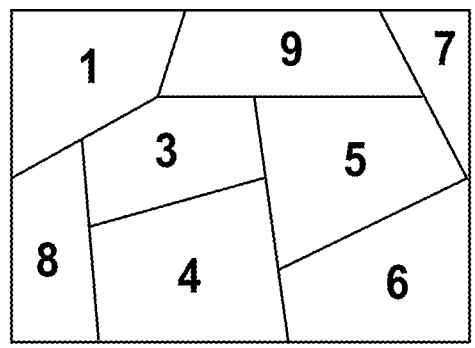
FIG. 7 illustrates a neighbor table according to an embodiment.
FIG. 8 illustrates a neighbor relation map according to an embodiment.

The output of the relation module 105 can be or be used to construct a neighbor relation table that is intended to show the eNB neighbors of an eNB as well as any gNodeB neighbors in a 5G network as shown in FIG. 7. The neighbor relation table is built by counting the number of times any UE moves from one cell to another cell. The system is configured to receive networking messaging and the relation module 105 and analysis module 110 may retrieve network messaging and review the content of the network messaging. The relation module 105, from review of, for example, the S11 or S1-MME (S1-CP) message, may obtain the cell origin and destination. For the examples noted below, reference to S11 messages is intended to include S1-MME messages, or equivalent messages. It will be understood that examples provided in this disclosure refer to eNodeB's but are intended to apply equally to 5G network resources including gNodeB's where appropriate.

The analysis module 110 is configured to detect the number of times HO failures occurred between pairs of cells, based on observing S11 messages. Lack of S11 messages between a pair of cells, for a long period of time indicates a HO failure. In some cases, the target (or the destination) eNB may also explicitly send a handover failure message to the MME. Having the system 100 receive and review this type of messaging can be beneficial to the analysis module 110, however sometimes these failure messages may not be received. Embodiments of the system and method are configured to analyze the network traffic as a whole and not rely solely on the reception of specific messages as indications of handover failures. The analysis module 110 may be further configured to monitor and aggregate handover data over a period of time, for example, over an hour, over a day, over a week or the like.

The correlation module 130 is configured to additionally detect the type of HO failures that occurred based on correlating the data plane (from, for example, SGi or S5/S8) with the S11 messages.

The example provided below is based on a fictional network in order to illustrate embodiments of the system and method disclosed herein. It will be understood that networks may have more or less cells, and that the number of handovers between cells may be higher or lower.

The method for handover management is detailed with regard to the example herein. The relations module is configured to learn the neighbor relations over a predetermined duration of time, for example, 1 day, 1 week, 1 month, 2 months, 6 months or as appropriate for the network. The relation module is configured to determine a table, as shown in FIG. 7, and from the table, determine a map of the network. An example map is shown in FIG. 8. It is intended that the relation module 105 will continue to monitor neighbor relations and continue to update the map regularly as UEs move around between cells.

After the relation module 110 has completed an initial map, the analysis module 110 is configured to monitor the S11 message to detect the number of times any movement is detected between a pair of neighboring cells. If there are no UEs that move over a predetermined period of time between the two cells, by observing S11 messages, then the analysis module 110 may determine that there is a handover failure between the two cells. In some cases, the period of time may be a few hours, for example 4 hours, 6 hours, 10 hours or greater. It is intended that the period of time would be such that it would be highly unlikely that there was no handover between the pair of cells within that period of time. The excessive movement into or out of cell indicates that the cells are not appropriately load balanced and may trigger the reporting module 115 for load balancing. Further, the reporting module may prepare a table, for example the table shown in FIG. 9, to report to the operator the cells experiencing handover failure and the cells that are having successful handovers.

In some cases, an excessive movement into and out of cells may be determined by aggregating the handover data over a plurality of cells, for example a pair of cells. Where the analysis module 110 determines that the aggregated data is above a predetermined threshold, it may be determined that there is excessive movement into and out of cells, the reporting module 115 may alert the network operator of the issue and the pair of cells in question. The predetermined threshold may be determined based on average movement of between cells in the operator's network, or may be configurable by the network operator. In some cases, the reporting module 115 may trigger a rebalancing of the cells which would benefit from load balancing.

In some cases, the presence of S11 messages between a pair of cells does not necessarily indicate that the handovers were successful. The correlation module 130 is configured to examine S11 messages when available to help detect the type of Handover Failure. If the S11 message is available, then it is correlated with the data plane throughput information from SGi interface (for example, score statistics) to determine if there is a HO attempted that resulted in a failure. Score statistics is a mechanism of collecting data needed for the analysis detailed herein. However, the correlation is intended to be conducted with any data that is appropriate. In some cases, it is helpful if the data is sufficiently granular, for example, data collected in the order of seconds. Score statistics is an example of data that is collected frequently, for example, every second, and can be used to estimate the throughput, although other data may also be used.

During the learning phase of the relation module, the highest value of the HO duration between a pair of cells may be noted. The relation module, similar to identifying the neighboring cell as noted above, can identify the pair of cells. The highest value of the HO duration is obtained by observing the traffic patterns and is described herein.

After the relation module 105 has learned a predetermined number of neighboring cells, the timing of the S11 messages are matched with the traffic patterns to detect the type of HO failure. In some cases, the relation module may create a table as shown in FIG. 10. If the timing between incoming S11 messages and certain traffic patterns in the data plane exceeds a predetermined threshold, then a Handover Failure of a certain type is flagged. In some cases, three types of failures may be detected by the correlation module, for example, Too Early Handover, Too Late Handover, Ping-Pong Failure. Other types of failures may also be determined/included. The traffic patterns for a normal handover event are generally distinct as are the traffic patterns for Too Early Handover, Too Late Handover and Ping-Pong Failures. The correlation may provide to the reporting module a table summarizing the type of handover failures, for example, a table similar to that shown in FIG. 11.

The correlation module 130 may be configured to observe or retrieve data from either the downlink data or the uplink data on the SGi interface and use this data to correlate with the S11 information to detect the type of handover failures. The correlation module 130 can be configured to correlate the timing between the S11 and the data stream. Therefore, it may be more effective for the correlation module 130 to monitor the uplink data flow coming from the UE towards the network because the uplink flow is not buffered. Packets from the downlink flow may be buffered at the SGW or at the eNB to allow the eNB to make a successful handover. Packets from the uplink flow may not be buffered at all once the packets reach the eNB since it is the radio link that has the highest variability in quality. Therefore, the uplink flow may be more beneficial to be correlated with the S11 information.

Embodiments of the system and method may identify handover issues without the need for any input from the eNB. Conventional solutions generally require that the network device either reside at (or within) the eNB (Distributed SON handover mechanism), or that the device receives inputs from the eNB through a northbound interface (Centralized SON handover mechanism). Further, conventional solutions typically require a client server relationship in existing SON mechanisms that requires information to be published to the server, in order for the server to make inferences on handover issues.

Embodiments of the system and method herein are intended to retrieve or determine information from the User-plane and S11 taps in the core network. The information captured from the taps is intended to work across RAN eNBs from multiple vendors.

Embodiments of the system and method disclosed herein are not intended to require any information from the RAN. Hence the system and method are not intended to be dependent on the need for any additional interfaces besides the standard S11 interface (between MME and SGW). Alternatively, as mentioned earlier, instead of the S11 information it is possible to choose the information contained in S1-MME (sometimes called S1-CP).

Embodiments of the system and method are intended to scale across a large number of eNBs irrespective of the cell types or the number of cells. As the system is generally resident in the core network and as the system generally does not need any prior knowledge of the eNB, the system may scale more easily than conventional solutions. The system and method herein are intended to work equally effectively in multivendor environments as in single RAN vendor deployments.

Figures 11, 12:
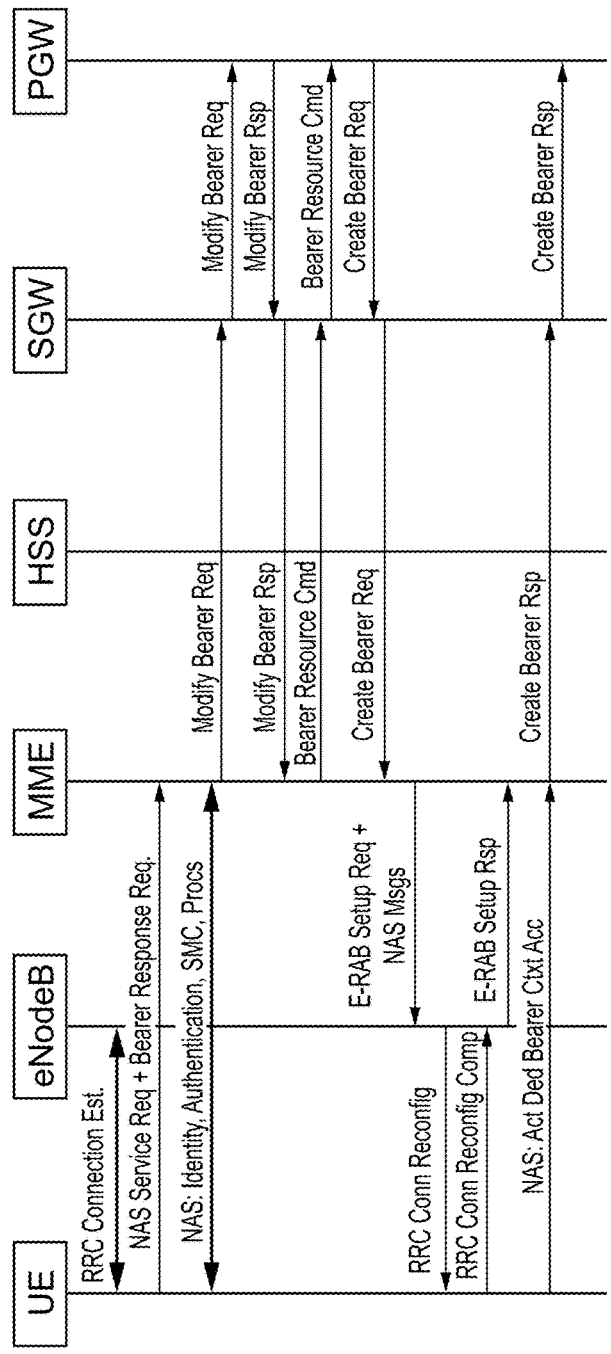
FIG. 11 is table showing the detection of handover failure according to an embodiment.
FIG. 12 illustrates signaling messaging during a handover.

A method for handover management is shown with reference to the sequence diagram for signaling messages in FIG. 12. Initially, the system will monitor the UE journey across cells. The analysis module 110 examines the S11 information to indicate the cells that originated handover and the cells to which handover was successfully executed. In one embodiment of the system, without the correlation module 130, HO failure detection may be analyzed by the analysis module 110 with S11 control information.

From FIG. 12, UE_A may be experiencing a handover. The relation module 105 examines S11 to monitor handover events. From S11 messages, the relation module may record and determine that UE_A was moving from Cell 3 (at time t11) to Cell 4 (at time t12) from looking at S11 HO message) identify cell 3 and cell 4. In particular, in the message, there will be the old cell associated with S11 and a new cell associated with S11 will be contained in the 'Modify Bearer Request'. The Modify Bearer Request message is sent on the S11 interface by the MME to the SGW. The data is collected and the relation module 105 may insert an entry into a neighbor table. Similarly, from S11 message, the relation module 105 can record and determine that UE_A was moving from Cell 4 (at time t21) to Cell 7 (at time t22) and may record this information in the neighbor table, for example the table as in FIG. 13, or otherwise record this relationship.

For UE_B, the relation module 105 is configured to examine S11 to monitor handover events. From S11 messages, the system may record and determine that UE_B was moving from Cell 6 (at time t41) to Cell 5 (at time t42) and store this information. Further, from another S11 message, the system may record and determine that UE_B was moving from Cell 5 (at time t51) to Cell 4 (at time t52). The relation module 105 may store the relations in a table or otherwise store this information and may continue in a similar manner to determining incoming and outgoing cells from S11 messages. The data determined and retrieved by the relation module 105 may be stored in the memory component to be accessed by the modules of the system.

After a predetermined period (i.e. an appropriate amount of time as described herein), the relation module may be able to learn all the neighbor relations shown in for example, previously FIG. 7 and build a neighbor relation map shown previously in FIG. 8. This map may be updated regularly, by the relation module, as UEs move around between cells.

After this data is constructed, the system, via, for example, the analysis module 110, may monitor the number of time the UEs move across cells.

For embodiments of the system having a correlation module, the system may detect the type of HO failures with S11 control information and Data plane information. In particular, the lack of S11 messages for sustained period of time indicates a HO failure. However, system not having a correlation module may not determine the type of Handover failure and may simply indicate that there is a failure based on the absence of S11 events.

Embodiments of the system having the correlation module 130 may allow for additional information to be obtained to determine the type of handover failure, for example, if the handover is 'Too Early' failure 'Too Late' Failure or the like.

If a network Operator wants to determine the type of HO failure based on the presence of S11, then the data plane information may be needed. In embodiments with a correlation module 130, the signaling patterns from S11 are additionally correlated with the data plane traffic patterns to learn the type of failure.

In some cases, the correlation module 130 may match the S11 messages with, for example, score statistics, high frequency data plane throughput records, to determine the type of failure events. The S11 timestamp may be matched with score statistics record timestamps. If there is any delay in S11 or external delay—then it is calibrated upfront and the bias is subtracted from the S11 timing messages.

In this system, the relation module 105 is configured to learn the neighbors and the duration for successful handovers between neighboring cells. The relation module 105 monitors the UE journey between cells. Additionally, previous to the method noted above, the relation module 105 may further determine the duration of the handover for every UE journey. In some cases, additional column may be included in the table to indicate the 'highest values of the HO duration between Cell_i and Cell_j' based on prior history of movement between Cell_i and Cell_j. The highest values are recorded as the highest values are intended to be indicative of the highest duration during which packets are queued while still allowing for a successful handover. The highest value will account for all the successful handovers, for a particular cell pair combination. The highest value sets a lower bound baseline against which embodiments of the system and method may compare unsuccessful handovers.

Figures 14, 15:
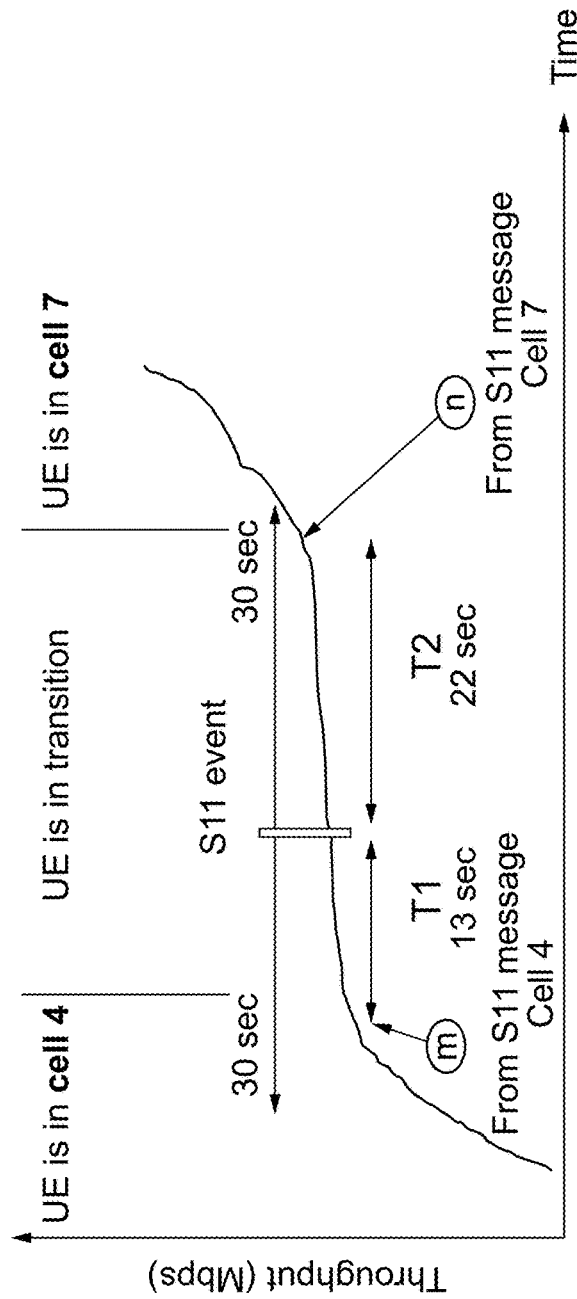
FIG. 14 is a graph illustrating a User Equipment handover.
FIG. 15 is a table showing cell neighbors that the duration of a handover.

So in this example, if UE_B moves between cell 4 to cell 7 in 23 seconds, and the previously highest value of handover duration recorded by some other UE movement between cell 4 and cell 7 was 45 seconds, then the previous highest value of HO duration remains. FIG. 15 illustrates an example table, which stores the values of the highest duration for a handover between any two neighboring cells.

The relation module is configured to determine the duration of a Handover between any two cells by determining the sum of T1+T2, as shown in FIG. 14 and detailed herein.

The relation module is configured to use S11 for cell identification information and score statistics that indicates throughput trends. The table in FIG. 14 may be constructed by examining the S11 message for cell-id information and looking for the knee 'm' and 'n' in FIG. 14 that indicates when the handover started and ended.

The relation module 105 during the learning phase, or the analysis and correlation module during the implementation phase may determine the Handover Duration as a UE moves between two cells. The system may receive an S11 event, which may sets off a Trigger or otherwise start a timer.

The system may review the S11 events and observe before and after for a predetermined interval, for example, for about 30 seconds before and 30 seconds after, or for about 1 minute before and 1 minute after, or the like, to look for the knee of the curve at instants 'm' and 'n' shown in FIG. 13. The system is then configured to identify the time duration T1 in interval 1, shown by the indicator 'm'. T1 corresponds to the time instant 'm' when the throughput rate ramps and then flattens out. This behaviors may be observed as during a handover, packets begin to queue until the handover is completed. This behavior is typical in a handover as packets queue while waiting for the handover from source eNB to destination eNB is completed. During this time, the throughput does not increase because the radio link is effectively unavailable to deliver packets to the destination. Once the handover is completed then the queued packets are forwarded via the destination eNB and the user.

The system can be configured to note the cell id from the S11 message at that time corresponding to T1, for example cell 4. T1 corresponds to the time instant in the S11 record just before the UE transitions in from cell 4.

The system may then be configured to identify time duration T2 in interval 2, shown by the indicator 'n'. T2 corresponds to the time instant 'n' when the throughput rate ramps again. The throughput rate is intended to ramp up because there is a handover period that allows the queued packets to be drained by the eNB scheduler. The system, via for example the analysis module 110, is configured to determine and store the cell id from the S11 message at the time corresponding to T2, for example, cell 7. T2 corresponds to the time instant in the S11 record just before the UE transitions out from cell 7. The table in FIG. 15 is an example of cell neighbors and the acceptable duration of handover event.

Once the learning phase is over, the absence of a S11 event will generally indicate a Handover Failure. The presence of a S11 event may also indicate a Handover Failure. As such, to determine if a Handover failed, and to determine the type of Handover failure an S11 event is noted by the analysis module 110. Further, the system is configured to note the time T1 and time T2. The sum of T1 and T2 is approximately equal to the total Handover duration.

In a particular example, the sum of T1+T2 may be 35 seconds. The system may then determine that this is the time it takes to handover from cell 4 to cell 7. In the example shown in the FIG. 14, it is 35 seconds.

Once the time is determined, the system may review previously stored data, for example from previously stored table of FIG. 15. The correlation module may determine the highest value of the Handover duration between Cell 4 to Cell 7. In this example, the result was previously H47. If 35 seconds is less than H47, then it indicates no handover failure and if 35 seconds is more than H47, then it indicates that there was a handover failure.

Further, the system is configured to determine the time interval T1 and T2, via for example the analysis module 110 or correlation module 130. This time interval is intended to indicate the type of handover failure. Determining the cause of HO failure involves comparing T1 and T2 values compared a certain threshold (configurable). The range of values would be specific to the cells. The highest value may be learned over time, and may recorded and stored as detailed herein. If T1 or T2 exceeds a predetermined acceptable value, then a failure is indicated. The correlation module 130 may then be configured to determine the failure cause as follows:

i. If T1 is small compared to a certain predetermined configurable threshold, then it indicates 'Too Early' Handover;
ii. If T2 is small compared to a certain predetermined configurable threshold, then it likely indicates 'Too Late' Handover; and
iii. If repetitive patterns of T1 and T2 are observed over a few iterations, then it indicates Ping-Pong.

FIG. 16 illustrates a table showing the detection of handover failure of various types.

The S11 timestamp is matched with score statistic record timestamp. If there is any delay between S11 timestamp and the record timestamp, then the delay may be calibrated and subtracted. One way to calibrate the delay is to compare a known (and hence accurate) timestamp against a known (and hence accurate) S11 timestamp. Since both are accurate, then the delay differential represents the time it takes for the S11 messages to be collected and recorded. This delta time may then be recorded, stored and subtracted in the future from all S11 messages because subtracting this delta off from the S11 messages would indicate the exact time when the S11 Handover event happened.

For the purposes of matching the control plane information with the data plane information, the upstream data plane traffic may be considered by the system. Upstream traffic (for example, OTT Voice Uplink) is not buffered, since once the traffic reaches the eNB, there is generally no need for buffering. Downstream traffic may be buffered at multiple points before reaching the eNodeB, which generally prevents as accurate of matching as in upstream traffic.

In another embodiment, the system and method may keep a measure of the delta of Pre-T1 vs T1 and T2 vs Post-T2 traffic pattern variations. For a normal handover: the difference of the slopes before the knee and right after the knee may be measured and tabulated, computed as "slope of pre-T1 minus the slope of the T1 duration". The slope is measured by change in throughput versus time. Then, for every incoming S11 message, this difference may be compared against the slope differentials for normal handover operation. If the difference exceeds a threshold, then a handover failure is declared. The degree to which this slope difference exceeds that of the slope difference during normal operation would indicate the level of severity of the handover failure. This measure is intended to allow the system and method to determine the severity of the handover failure.

In the preceding description, for purposes of explanation, numerous details are set forth in order to provide a thorough understanding of the embodiments. However, it will be apparent to one skilled in the art that these specific details may not be required. It will also be understood that aspects of each embodiment may be used with other embodiments even if not specifically described therein. Further, some embodiments may include aspects that are not required for their operation but may be preferred in certain applications. In other instances, well-known structures may be shown in block diagram form in order not to obscure the understanding. For example, specific details are not provided as to whether the embodiments described herein are implemented as a software routine, hardware circuit, firmware, or a combination thereof.

Embodiments of the disclosure or elements thereof can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with other modules and elements, including circuitry or the like, to perform the described tasks.

The above-described embodiments are intended to be examples only. Alterations, modifications and variations can be effected to the particular embodiments by those of skill in the art without departing from the scope, which is defined solely by the claim appended hereto.

What is claimed is:

1. A method for managing handovers on a network, the method comprising:
   determining neighboring cells within the network;
   mapping the neighboring cells to create a network map of neighboring cells;
   analyzing handover data between the mapped cells within the network map, wherein the handover data is retrieved from network messaging;
   determining for each handover whether the handover is a successful handover or an unsuccessful handover based on the handover data and a type of handover failure for any unsuccessful handover, wherein the type of handover failure is determined by observing data plane traffic patterns and the timing of the network messaging; and
   reporting any unsuccessful handovers to an operator for the network.

2. A method according to claim 1, wherein determining the type of handover failure for the unsuccessful handovers comprises: determining if the handover was a too early handover, a too late handover, or a ping-pong handover.

3. A method according to claim 1, further comprising:
   providing for corrective action based on the unsuccessful handovers, wherein the corrective action comprises handover setting changes or trigger different change times for the handover settings.

4. A method according to claim 1, wherein the network messaging comprises S11 or S1-MME (S1-CP) messages.

5. A method according to claim 1, wherein determining neighboring cells comprises:
   monitoring user equipment as the user equipment travels;
   recording a source cell and a target cell for each cell handover; and determining which cells are neighboring based on the recorded source and target cells.

6. A method according to claim 1, wherein a handover is determined as unsuccessful based on a lack of network messaging.

7. A method according to claim 6, wherein the lack of network messaging comprises:
   an S11 event message with a source cell and no subsequent S11 event message from a target cell.

8. A method according to claim 1, wherein determining the type of handover failure comprises:
   determining signaling patterns from the network messaging; and
   correlating the signaling patterns with observed data plane traffic patterns.

9. A method according to claim 8 wherein the data plan traffic patterns are upstream traffic patterns.

10. A method according to claim 1, further comprising:
    aggregating results of the successful handovers and unsuccessful handovers;
    determining if there is a number of handovers between a pair of network cells over a predetermined threshold;
    if there is a number of handovers over the predetermined threshold, triggering a load balancing between the pair of network cells.

11. A system for managing handovers on a network, the system comprising:
    a relation module configured to determine neighboring cells within the network and map the neighboring cells to create a network map of neighboring cells;
    an analysis module configured to analyzing handover data between the mapped cells within the network map, wherein the handover data may be retrieved from network messaging and determine for each handover whether the handover is a successful handover or an unsuccessful handover based on the handover data and a type of handover failure for any unsuccessful handover, wherein the type of handover failure is determined by observing data plane traffic patterns and the timing of the network messaging; and
    a reporting module configured to report unsuccessful handovers to an operator for the network.

12. A system according to claim 11, wherein the system further comprises:
    a correlation module configured to determine if the handover was a too early handover, a too late handover, or a ping-pong handover for the unsuccessful handovers.

13. A system according to claim 11, wherein the reporting module is further configured to provide for corrective action based on the unsuccessful handovers, wherein the corrective action comprises handover setting changes or trigger different change times for the handover settings.

14. A system according to claim 11, wherein the network messaging comprises S11 or S1-MME (S1-CP) messages.

15. A system according to claim 11, wherein the relation module is configured to determine neighboring cells by:
    monitoring user equipment as the user equipment travels;
    recording a source cell and a target cell for each cell handover; and
    determining which cells are connected based on the recorded source and target cells.

16. A system according to claim 11, wherein the analysis module determines a handover is determined as unsuccessful based on a lack of network messaging.

17. A system according to claim 16, wherein the lack of network messaging comprises:
    an S11 event message with a source cell and no subsequent S11 event message from a target cell.

18. A system according to claim 11, wherein the correlation module determines the type of handover failure by:
    determining signaling patterns from the network messaging; and
    correlating the signaling patterns with observed data plane traffic patterns.

19. A system according to claim 18 wherein the data plan traffic patterns are upstream traffic patterns.

20. A system according to claim 11, wherein the analysis module is further configured to aggregate results of the successful and unsuccessful handovers and determine if there is an number of handovers between a pair of network cells over a predetermined threshold; and
    the reporting module is further configured to trigger a load balancing between for the pair of network cells to if the number of handovers is over the predetermined threshold.

* * * * *